United States Patent
Jeong et al.

(10) Patent No.: US 9,627,688 B2
(45) Date of Patent: Apr. 18, 2017

(54) ANODE FOR SECONDARY BATTERY AND LITHIUM SECONDARY BATTERY INCLUDING SAME

(71) Applicant: LG Chem, Ltd., Seoul (KR)

(72) Inventors: Bong Hyun Jeong, Daejeon (KR); Im Goo Choi, Daejeon (KR); Byoung Bae Lee, Daejeon (KR); Kyoung Hun Kim, Daejeon (KR); Jang Bae Kim, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/289,778

(22) Filed: May 29, 2014

(65) Prior Publication Data

US 2015/0194677 A1 Jul. 9, 2015

Related U.S. Application Data

(63) Continuation of application No. PCT/KR2014/000103, filed on Jan. 6, 2014.

(51) Int. Cl.
*H01M 4/13* (2010.01)
*H01M 4/62* (2006.01)
(Continued)

(52) U.S. Cl.
CPC .......... *H01M 4/622* (2013.01); *H01M 4/134* (2013.01); *H01M 4/1395* (2013.01);
(Continued)

(58) Field of Classification Search
CPC .... H01M 4/134; H01M 4/1395; H01M 4/366; H01M 4/485; H01M 4/622; H01M 4/623;
(Continued)

(56) References Cited

U.S. PATENT DOCUMENTS

2001/0004504 A1  6/2001  Nakamizo et al.
2003/0035995 A1* 2/2003  Ohsaki .................. H01M 4/131
                                                              429/217

(Continued)

FOREIGN PATENT DOCUMENTS

CN     101188291 A    5/2008
CN     103259039 A    8/2013
(Continued)

OTHER PUBLICATIONS

Bentor, Yinon. Chemical Element.com—Copper. Jun. 23, 2015 <http://www.chemicalelements.com/elements/cu.html>.*

(Continued)

*Primary Examiner* — Nicholas P D'Aniello
*Assistant Examiner* — Jimmy K Vo
(74) *Attorney, Agent, or Firm* — Lerner, David, Littenberg, Krumholz & Mentlik, LLP

(57) ABSTRACT

The present disclosure provides an anode for a secondary battery, including: an electrode current collector; a first coating layer formed on the electrode current collector and including an anode active material, a first aqueous binder and a conducting material; and a second coating layer formed on the first coating layer and including a second nonaqueous binder. Since the anode of the present disclosure can reduce volume change of the anode active material, a lithium secondary battery including same may have improved cycle characteristics.

7 Claims, 3 Drawing Sheets

(51) Int. Cl.
*H01M 4/36* (2006.01)
*H01M 4/134* (2010.01)
*H01M 4/1395* (2010.01)
H01M 4/48 (2010.01)
H01M 4/66 (2006.01)
H01M 10/052 (2010.01)
H01M 4/38 (2006.01)

(52) U.S. Cl.
CPC ........... *H01M 4/366* (2013.01); *H01M 4/623* (2013.01); *H01M 4/386* (2013.01); *H01M 4/483* (2013.01); *H01M 4/625* (2013.01); *H01M 4/661* (2013.01); *H01M 10/052* (2013.01)

(58) Field of Classification Search
CPC ...... H01M 4/386; H01M 4/483; H01M 4/625; H01M 4/661; H01M 10/052
See application file for complete search history.

(56) References Cited

U.S. PATENT DOCUMENTS

| | | | |
|---|---|---|---|
| 2003/0113627 | A1 | 6/2003 | Choi et al. |
| 2006/0127773 | A1* | 6/2006 | Kawakami et al. ........... 429/245 |
| 2007/0059600 | A1 | 3/2007 | Kim et al. |
| 2008/0118840 | A1* | 5/2008 | Yew et al. ................ 429/231.5 |
| 2008/0199773 | A1 | 8/2008 | Deguchi et al. |
| 2011/0189546 | A1 | 8/2011 | Ikeda |
| 2013/0216891 | A1 | 8/2013 | Byun et al. |
| 2013/0295457 | A1 | 11/2013 | Xu |
| 2014/0023921 | A1 | 1/2014 | Lee et al. |

FOREIGN PATENT DOCUMENTS

| | | |
|---|---|---|
| JP | H0582128 A | 4/1993 |
| JP | H07220759 A | 8/1995 |
| JP | H10306265 A | 11/1998 |
| JP | H11126601 A | 5/1999 |
| JP | 2001176497 A | 6/2001 |
| JP | 2003077476 A | 3/2003 |
| JP | 2008204788 A | 9/2008 |
| JP | 2009037891 A | 2/2009 |
| JP | 2010092820 A | 4/2010 |
| JP | 2010238426 A | 10/2010 |
| JP | 2011192610 A | 9/2011 |
| KR | 20030050475 A | 6/2003 |
| KR | 2007-0030487 A | 3/2007 |
| KR | 2009-0076275 A | 7/2009 |
| KR | 20120000708 A | 1/2012 |
| KR | 2012-0069314 A | 6/2012 |
| KR | 2013-0114926 A | 10/2013 |
| KR | 2013-0117350 A | 10/2013 |
| WO | 9850479 A1 | 11/1998 |

OTHER PUBLICATIONS

JP 2011-192610 English Translation, obtained Oct. 15, 2015 via JPO.*
International Search Report from PCT/KR2014/000103, dated Oct. 22, 2014.
International Search Report from PCT/KR2014/000105, dated Oct. 22, 2014.
Office Action from Chinese Application No. 201480001411.0, dated Jul. 26, 2016.

* cited by examiner

ANODE FOR SECONDARY BATTERY AND LITHIUM SECONDARY BATTERY INCLUDING SAME

CROSS-REFERENCE TO RELATED APPLICATIONS

The present application is a continuation of International Application No. PCT/KR2014/000103 filed on Jan. 6, 2014, the disclosure of which is incorporated herein by reference.

TECHNICAL FIELD

The present disclosure relates to an anode for a secondary battery and a lithium secondary battery including same, more particularly to an anode for a secondary battery, capable of effectively improving the degradation of a silicon-based anode during charging and discharging because of large volume change, and a lithium secondary battery including same and thus having improved cycle characteristics.

BACKGROUND ART

Recently, there is an increasing interest in energy storage technologies with the advancement of mobile phones, camcorders, notebook computers, electric cars, etc. In particular, electrochemical devices are drawing a lot of attentions and, among them, rechargeable secondary batteries are the center of attention.

Especially, lithium secondary batteries using lithium and an electrolyte are being actively developed because they are small-sized and lightweight and are likely to realize high energy density.

As anode active materials for existing lithium secondary batteries, carbon-based compounds have been mainly used because reversible intercalation and deintercalation of lithium ions is possible while maintaining structural and electrical properties. Recently, as it is known that silicon, tin or alloys thereof can reversibly intercalate and deintercalate a large amount of lithium ions through chemical reactions, a lot of researches are underway thereabout.

Since silicon has a maximum theoretical capacity of about 4020 mAh/g (9800 mAh/cc, specific gravity=2.23), which is substantially greater than that of graphite-based materials, it is promising as an anode material. However, silicon or its alloy is problematic in that the cycle life of the battery is shortened due to degradation of the anode owing to volume change upon repeated charging and discharging. To describe in detail, during charging, as lithium ions migrate into the anode active material (silicon), the anode active material has a denser structure as the overall volume increases. During discharging, the volume of the anode active material decreases as the lithium ions are released. Since the anode active material and other components mixed therewith have different coefficients of expansion, voids are formed. Electrons cannot migrate efficiently because of the voids and, as a result, the battery becomes less efficient. In addition, cracking that may occur due to the decreased elasticity of the binder mixed with the anode active material leads to increased resistance since the cracking blocks electrical contact. As a consequence, the cycle characteristics of the secondary battery are degraded due to the degradation of the anode. This problem becomes severer as the content of the high-capacity anode active material, silicon, increases to provide a cell with a higher energy density.

A method of increasing the amount of the binder to improve adhesion of the anode active material during preparation of the anode has been attempted to improve this disadvantage. However, because the relative content of a conducting material or the anode active material is decreased, this leads to decrease in resistance characteristics, electrical conductivity, capacity and output of the battery.

For the existing carbon-based anode, the content of an aqueous binder such as styrene butadiene rubber (SBR) or carboxymethyl cellulose (CMC) is increased when preparing a slurry of an anode active material. However, since the aqueous binder forms a point contact with the adjacent anode active material, it is difficult to achieve sufficient binding under repeated expansion and contraction.

Accordingly, development of a technology for improving adhesion binding between lithium metal oxide and a current collector using an adequate amount of a binder and, at the same time, improving the performance of a secondary battery such as capacity and output characteristics by increasing electrical conductivity is necessary.

DISCLOSURE

Technical Problem

The present disclosure is directed to providing an anode for a secondary battery, including a coating layer including a nonaqueous binder, for effectively improving the degradation of a silicon-based anode during charging and discharging because of large volume change.

The present disclosure is also directed to providing a lithium secondary battery including the anode for a secondary battery and thus having improved cycle characteristics.

Technical Solution

Hereinafter, the present disclosure is described in more detail.

In one general aspect, the present disclosure provides an anode for a secondary battery, further including a second coating layer formed wholly or partly on an anode active material layer as a first coating layer, for effectively improving the degradation of a silicon-based anode during charging and discharging because of large volume change.

Specifically, the present disclosure provides an anode for a secondary battery, including:

an electrode current collector;

a first coating layer formed on the electrode current collector and including an anode active material, a first aqueous binder and a conducting material; and a second coating layer formed on the first coating layer and including a second nonaqueous binder.

In the anode of the present disclosure, the electrode current collector may be stainless steel, nickel, copper, titanium, alloys thereof or copper or stainless steel with the surface treated with carbon, nickel, titanium or silver. Specifically, copper or copper alloy may be used.

And, in the anode of the present disclosure, the anode active material, which is the main component of the first coating layer, may be: a carbon or graphite material such as natural graphite, artificial graphite, expanded graphite, carbon fiber, non-graphitizing carbon, carbon black, carbon nanotube, fullerene, activated carbon, etc.; a metal oxide alloyable with lithium, e.g., a metal such as Al, Si, Sn, Ag, Bi, Mg, Zn, In, Ge, Pb, Pd, Pt, Ti, etc. and a compound including the metal; a complex of the metal or the compound with a carbon or graphite material; a lithium-containing nitride; or a combination thereof. More specifically, the anode active material may be one or more selected from a group consisting of crystalline carbon, amorphous carbon, a silicon-based active material ($SiO_x$, $0<x<2$), a tin-based active material and a silicon-carbon-based active material. Specifically, an anode active material including a silicon-based active material may be used.

In an exemplary embodiment of the present disclosure, the first aqueous binder included in the first coating layer serves as a component helping binding between the anode active material, the conducting material and the current collector and may be included in an amount of 1-20 wt % based on the total weight of first coating layer. If the content of the first aqueous binder exceeds 20 wt %, resistance increases because the area of the binder increases.

For example, the first aqueous binder may be one or more aqueous binder selected from a group consisting of styrene-butyl acrylate rubber (SBR), carboxymethyl cellulose (CMC) and hydroxypropyl cellulose.

The conducting material serves as a component for further improving the conductivity of the anode active material and may be included in an amount of 1-20 wt % based on the total weight of first coating layer. The conducting material is not particularly limited as long as it can provide electrical conductivity without inducing chemical change of the battery. For example, graphite such as natural graphite, artificial graphite, etc.; carbon black such as acetylene black, ketjen black, channel black, furnace black, lamp black, thermal black, etc.; electrically conductive fiber such as carbon fiber, metal fiber, etc.; fluorinated carbon; metal powder such as aluminum powder, nickel powder, etc.; electrically conductive whisker such as zinc oxide, potassium titanate, etc.; electrically conductive metal oxide such as titanium oxide; or electrically conductive material such as polyphenylene derivative, etc. may be used.

The first coating layer may further include other additives in addition to the above-described components, if necessary, and specific examples, contents, etc. thereof may be those commonly employed in the related art.

The first coating layer is an anode active material layer and is formed by preparing a first slurry by mixing the anode active material, the first aqueous binder, the conducting material and a solvent, coating the slurry on a current collector, and drying same.

Water may be used as the solvent.

The thickness of the first coating layer may be adequately changed according to the desired battery capacity. Specifically, the thickness may be from tens to hundreds of micrometers.

The first binder may be coated either on the entire surface of the anode active material particles or only at the contact areas of the anode active materials. Specifically, it may be coated with an area capable of maintaining adequate binding while minimizing resistance.

In an exemplary embodiment of the present disclosure, the second nonaqueous binder included in the second coating layer may have superior wetting property and penetrate deep into the electrode and thus may further improve binding between the anode active material and the current collector. For example, the second nonaqueous binder is a chain-type polymer and may be one or more nonaqueous binder selected from a group consisting of polyvinylidene fluoride (PVDF), polyacrylonitrile (PAN), an acrylonitrile-containing binder (X-linking agent), polyvinyl alcohol, polyvinyl chloride, polyvinylpyrrolidone, polytetrafluoroethylene, polyethylene and polypropylene.

The second coating layer is a binder coating layer and is formed by preparing a second slurry by mixing the second binder and a solvent, coating the slurry on the whole or part of the surface of the electrode on which the dried first coating layer has been coated, and drying same.

Various solvents that can dissolve the nonaqueous binder such as N-methylpyrrolidone (NMP) or alcohols, ketones, etc. may be used as the solvent.

The second coating layer can be formed by any usual coating method without particular limitation. For example, it may be coated by commonly employed coating methods such as dip coating, spray coating, etc.

The second coating layer including the second binder 15 may be coated on the whole surface of the electrode on which the first coating layer has been formed or may be coated selectively on the first binder 13 which is bound to the point contact area of neighboring anode active material particles 11 (see FIG. 1). Specifically, it may be coated with an area capable of maintaining adequate binding. For example, the second coating layer may be coated in an amount of not greater than about 100 wt %, specifically about 1-50 wt %, more specifically about 1-10 wt %, further specifically about 1-5 wt %, based on the total weight of the electrode on which the first coating layer has been formed.

The second coating layer may further include a conducting material and other additives for improving conductivity.

In another general aspect, the present disclosure provides a lithium secondary battery including the anode of the present disclosure, a cathode, an electrolyte and a separator and thus having improved charge-discharge characteristics and cycle characteristics.

The cathode may be prepared by coating a slurry including a cathode active material, a conducting material and a binder on a cathode current collector and drying same, as in the preparation of the anode. If necessary, the slurry for preparing the cathode may further include a filler.

The cathode current collector is not particularly limited as long as it has high electrical conductivity and does not cause chemical change of the battery. For example, stainless steel, aluminum, nickel, titanium, sintered carbon, or aluminum or stainless steel surface-treated with carbon, nickel, titanium, silver, etc. may be used. The cathode current collector may have fine irregularities formed on its surface to enhance binding with the cathode active material. The cathode current collector may be in various forms including film, sheet, foil, net, porous structure, foam, nonwoven fabric, etc.

The cathode active material may be, for example, an intermetallic layered compound such as lithium cobalt oxide ($LiCoO_2$), lithium nickel oxide ($LiNiO_2$), etc. or the layered compound substituted with one or more transition metal; $LiNi_{1-x-y}Co_x(Al)_yO_2$ (x=0.15, y=0.05) or lithium manganese oxide such as $Li_{1+x}Mn_{2-x}O_4$ (x=0-0.33), $LiMnO_3$, $LiMn_2O_3$, $LiMnO_2$, etc.; lithium copper oxide ($Li_2CuO_2$); vanadium oxide such as $LiV_3O_8$, $LiFe_3O_4$, $V_2O_5$, $Cu_2V_2O_7$, etc.; Ni site type lithium nickel oxide represented by the formula $LiNi_{1-x}M_xO_2$=Co, Mn, Al, Cu, Fe, Mg, B or Ga, x=0.01-0.3); lithium manganese composite oxide represented by the formula $LiMn_{2-x}M_xO_2$ (M=Co, Ni, Fe, Cr, Zn or Ta, x=0.01-0.1) or $Li_2Mn_3MO_8$ (M=Fe, Co, Ni, Cu or Zn); $LiMn_2O_4$ wherein Li is partially substituted with alkaline earth metal ions; a disulfide compound; $Fe_2(MoO_4)_3$, etc., specifically $LiNi_xMn_{2-x}O_4$ (x=0.01-0.6), more specifically $LiNi_{0.5}Mn_{1.5}O_4$ or $LiNi_{0.4}Mn_{1.6}O_4$. That is to say, a spinel lithium manganese composite oxide $LiNi_xMn_{2-x}O_4$ (x=0.01-0.6) having relatively high potential may be used as the cathode active material in the present disclosure since the anode active material has high potential.

The conducting material may be included in an amount of 1-10 wt % based on the total weight of the slurry for the cathode and is not specially limited as long it has electrical conductivity and does not cause chemical change of the battery. For example, graphite such as natural graphite, artificial graphite, etc.; carbon black such as acetylene black, ketjen black, channel black, furnace black, lamp black, thermal black, etc.; electrically conductive fiber such as carbon fiber, metal fiber, etc.; fluorinated carbon; metal powder such as aluminum powder, nickel powder, etc.; electrically conductive metal oxide such as titanium oxide, etc.; electrically conductive material such as polyphenylene derivative, etc. may be used.

The binder is a component for improving binding between the active material, the conducting material and the current collector and is commonly included in an amount of 1-50 wt % based on the total weight of the mixture including the cathode active material. The binder may be, for example, a nonaqueous binder such as PVDF, etc.

The filler is optionally used as a component for inhibiting expansion of the cathode and is not specially limited as long as it is a fibrous material not causing chemical change of the battery. For example, an olefin-based polymer such as polyethylene, polypropylene, etc.; or a fibrous material such as glass fiber, carbon fiber, etc. may be used.

The electrolyte is a lithium salt-containing electrolyte and may be a nonaqueous organic solvent, an organic solid electrolyte, an inorganic solid electrolyte, but is not limited thereto.

The lithium salt may be a material that is readily soluble in the nonaqueous electrolyte and may be, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, a lower aliphatic lithium carboxylate, lithium tetraphenylborate, lithium imide salt, etc.

The nonaqueous organic solvent may be, for example, an aprotic organic solvent such as N-methyl-2-pyrrolidinone, propylene carbonate, ethylene carbonate, butylene carbonate, dimethyl carbonate, diethyl carbonate, γ-butyrolactone, 1,2-dimethoxyethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, phosphoric acid triester, tri methoxymethane, dioxolane derivatives, sulfolane, methyl-sulfolane, 1,3-dimethyl-2-imidazolidinone, propylene carbonate derivative, tetrahydrofuran derivatives, ether, methyl propionate, ethyl propionate, etc.

The organic solid electrolyte may be, for example, a polyethylene derivative, a polyethylene oxide derivative, a polypropylene oxide derivative, a phosphate ester polymer, poly agitation lysine, polyester sulfide, polyvinyl alcohol, polyvinylidene fluoride, a polymer containing ionic dissociable groups, etc.

The inorganic solid electrolyte may be, for example, a nitride, halide, sulfate, etc. of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, etc.

The separator is interposed between the cathode and the anode. A thin insulating membrane having high ion permeability and mechanical strength is used. As the separator, an olefin-based polymer having chemical resistance and hydrophobic properties such as polypropylene, etc.; or a sheet, nonwoven fabric, etc. made of glass fiber, polyethylene, etc. may be used. When the solid electrolyte such as polymer is used as the electrolyte, the solid electrolyte may also serve as the separator.

In another general aspect, the present disclosure provides a battery module including the secondary battery as a unit cell, a battery pack including the battery module, and a device including the battery pack.

As described above, whereas the existing anode suffers from volume change of the anode active material during charging and discharging because of decreased elasticity of the binder mixed with the anode active material, the anode of the present disclosure can be effectively prevented from degradation since the coating layer including the second nonaqueous binder further coated on the surface of the electrode having the active material layer including the aqueous binder formed thereon maintains adequate binding between the first coating layer and the current collector and, thus, the volume change of the anode active material during charging and discharging can be reduced. Accordingly, a lithium secondary battery having improved cycle life and charge-discharge characteristics can be prepared without increased resistance of the electrode.

Advantageous Effects

In accordance with the present disclosure, since a binder coating layer including a nonaqueous binder is further formed on an anode active material layer, degradation of a silicon-based anode during charging and discharging because of large volume change can be effectively prevented and, thus, charge-discharge characteristics and cycle characteristics of a lithium secondary battery can be improved.

DESCRIPTION OF MAIN ELEMENTS

Figure 1:
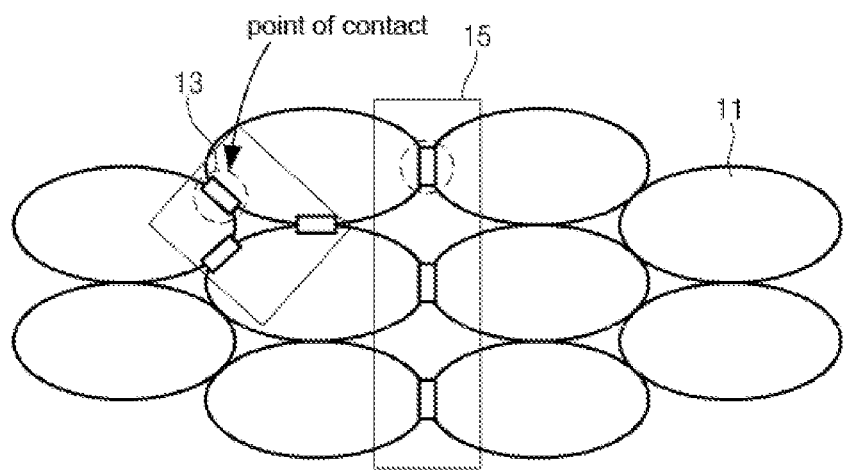
FIG. 1 is a schematic view of the structure of an anode active material of the present disclosure.

11: anode active material
13: first binder
15: second binder

BEST MODE FOR CARRYING OUT INVENTION

Hereinafter, the present disclosure will be described in detail through examples. However, the following examples are for illustrative purposes only and it will be apparent to those of ordinary skill in the art that the scope of the present disclosure is not limited by the examples.

EXAMPLES

I. Preparation of Slurry for Coating Layer

Preparation Example 1

A slurry for a second coating layer was prepared by dissolving polyacrylonitrile (PAN, 2 g) in 100 mL of N-methylpyrrolidone (NMP) and stirring for 1 hour.

Preparation Example 2

A slurry for a second coating layer was prepared in the same manner as in Preparation Example 1, except for using polyvinylidene fluoride (PVDF) instead of the polyacrylonitrile (PAN).

Preparation Example 3

A slurry for a second coating layer was prepared in the same manner as in Preparation Example 1, except for using an acrylonitrile-containing binder (X-linking agent) instead of the polyacrylonitrile (PAN).

II. Fabrication of Anode

Example 1

12 g (5 wt %) of a solution of carbon nanotube (CNT) as a conducting material was dispersed in 35 g (1.2 wt %) of a solution of carboxymethyl cellulose while stirring. Subsequently, $SiO_x$ (0<x<2) as a high-capacity anode active material and graphite exhibiting stable charge-discharge behavior were added to the mixture solution at a ratio of about 1:2 and the active material was dispersed using a mechanical stirrer. Then, after mixing 2 g (40 wt %) of a solution of styrene-butyl acrylate rubber (SBR), the mixture was stirred to prepare a slurry for a first coating layer in which the active material, the conducting material and the binder is mixed (The content of the binder in the first coating layer is not greater than 7%).

Subsequently, the slurry was coated on a copper (Cu) current collector to a thickness of about 100 μm using a comma coater and dried. Then, an anode plate having a first coating layer formed was prepared by drying once again in vacuo at 110° C.

Next, an anode plate including a second coating layer was prepared by coating the slurry for a second coating layer prepared in Preparation Example 1 on the surface of the anode plate (first coating layer) by dip coating and drying same.

Subsequently, a cathode active material composition was prepared by mixing $LiNi_{1-x-y}Co_x(Al)_yO_2$ (x=0.15, y=0.05) (NCA, TODA, 45 wt %), carbon black (Super-P, Timcal, 2.5 wt %), a vinylidene fluoride-hexafluoropropylene copolymer (Solef6020, Solvey, 2.5 wt %) and N-methylpyrrolidone (50 wt %), and a cathode plate was prepared by coating the composition on an aluminum current collector to a thickness of 200 μm and drying same.

Next, an organic electrolyte solution of 1.2 M lithium salt was prepared by adding $LiPF_6$ to a 3:4:3 mixture solvent of ethylene carbonate, dimethyl carbonate and ethyl methyl carbonate based on volume.

Subsequently, an electrode assembly was prepared by disposing polyethylene as a separator between the anode plate and the cathode plate. Then, a lithium secondary battery was prepared by putting the electrode assembly in a battery case and injecting the electrolyte.

Example 2

An anode plate and a secondary battery including same were prepared in the same manner as in Example 1, except for coating the slurry for a second coating layer of Preparation Example 2 instead of the slurry for a second coating layer of Preparation Example 1.

Example 3

An anode plate and a secondary battery including same were prepared in the same manner as in Example 1, except for coating the slurry for a second coating layer of Preparation Example 3 instead of the slurry for a second coating layer of Preparation Example 1.

Comparative Example 1

12 g (5 wt %) of a solution of carbon nanotube as a conducting material was dispersed in a 35 g (1.2 wt %) of a solution of carboxymethyl cellulose while stirring. Subsequently, $SiO_x$ as a high-capacity anode active material and graphite exhibiting stable charge-discharge behavior were added to the mixture solution at a ratio of about 1:2 and the active material was dispersed using a mechanical stirrer. Then, after mixing 2 g (40 wt %) of a solution of styrene-butyl acrylate rubber, the mixture was stirred to prepare a slurry for a first coating layer in which the active material, the conducting material and the binder is mixed. Subsequently, the slurry was coated on a copper (Cu) current collector to a thickness of about 100 μm using a comma coater and dried. Then, an anode plate having a first coating layer formed was prepared by drying once again in vacuo at 110° C.

Subsequently, a cathode active material composition was prepared by mixing $LiNi_{1-x-y}Co_x(Al)_yO_2$ (x=0.15, y=0.05) (NCA, TODA, 45 wt %), carbon black (Super-P, Timcal, 2.5 wt %), a vinylidene fluoride-hexafluoropropylene copolymer (Solef6020, Solvey, 2.5 wt %) and N-methylpyrrolidone (50 wt %), and a cathode plate was prepared by coating the composition on an aluminum current collector to a thickness of 200 μm and drying same.

Next, an organic electrolyte solution of 1.2 M lithium salt was prepared by adding $LiPF_6$ to a 3:4:3 mixture solvent of ethylene carbonate, dimethyl carbonate and ethyl methyl carbonate based on volume.

Subsequently, an electrode assembly was prepared by disposing polyethylene as a separator between the anode plate and the cathode plate. Then, a lithium secondary battery was prepared by putting the electrode assembly in a battery case and injecting the electrolyte.

III. Adhesion and Output Test

Experimental Example 1

The anode plate prepared in Example 1 was cut with 10-mm intervals and the adhesion force of the electrode on which the second coating layer and the first coating layer are coated was measured by 180° peel test. The result is shown in Table 1 and FIG. 2.

Experimental Example 2

The adhesion force of the anode plate prepared in Example 2 was measured in the same manner as in Experimental Example 1. The result is shown in Table 1 and FIG. 2.

Experimental Example 3

The adhesion force of the anode plate prepared in Example 3 was measured in the same manner as in Experimental Example 1. The result is shown in Table 1 and FIG. 2.

Comparative Experimental Example 1

The adhesion force of the anode plate prepared in Comparative Example 1 was measured in the same manner as in Experimental Example 1. The result is shown in Table 1 and FIG. 2.

TABLE 1

| Anode plate | Coating amount of second coating layer (wt %) | Adhesion force (gf/10 mm) |
| --- | --- | --- |
| Example 1 | 4.2 | 128.1 |
| Example 2 | 1.6 | 77.5 |
| Example 3 | 4.2 | 107.0 |
| Comparative Example 1 | — | 39.2 |

Figure 2:
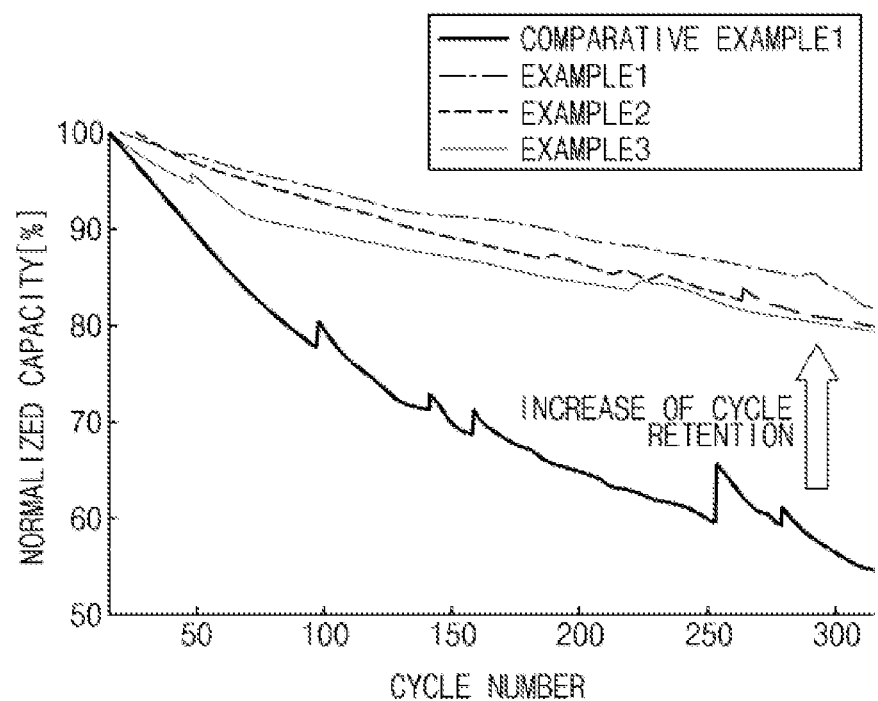
FIG. 2 shows a result of measuring cycle retention rate according to an exemplary embodiment of the present disclosure.

As seen from Table 1 and FIG. 2, the anode plates of Examples 1-3 having the second coating layer formed exhibited improved adhesion force greater than 50 gf/10 mm and there was no significant change in cycle retention even after long cycles. In contrast, the anode plate of Comparative Example 1 having only the first coating layer formed exhibited very low adhesion force lower than 50 gf/10 mm and there was significant change in cycle retention after long cycles. To compare the discharge capacity depending on cycles shown in FIG. 2, the anode plates of Examples 1-3 show improved lifetime with capacity retention rate of about 80% after 300 cycles whereas the anode plate of Comparative Example 1 shows very low capacity retention rate of about 60.5% after 300 cycles. Also, the adhesion force of the multilayer-structured anode plates having the second coating layer formed according to the present disclosure was proportional to the coating amount of the second coating layer coated on the first coating layer, as shown in Table 1.

Experimental Example 4

The output and resistance characteristics of the secondary batteries prepared in Examples 1-3 and Comparative Example 1 were measured by the hybrid pulse power characterization (HPPC) method.

Each lithium secondary battery was charged from SOC=10% to full (SOC=100%), with 0.1 C (4 mA) and 4.3 V and subjected to output and resistance testing according to the HPPC method after stabilization for 1 hour. Also, the lithium secondary battery was discharged from SOC=100% to SOC=10% with 10% intervals and subjected to output and resistance testing according to the HPPC method after stabilization for 1 hour for each discharging.

Figure 3A:
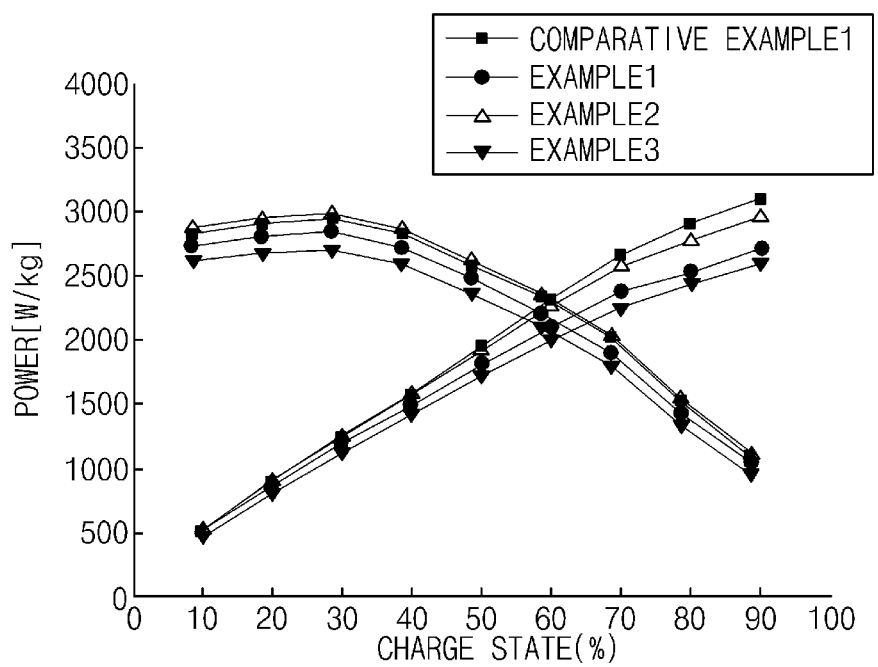
FIG. 3a and FIG. 3b show a result of measuring capacity retention rate of a lithium secondary battery according to the present disclosure in Experimental Example 4.
Figure 3B:
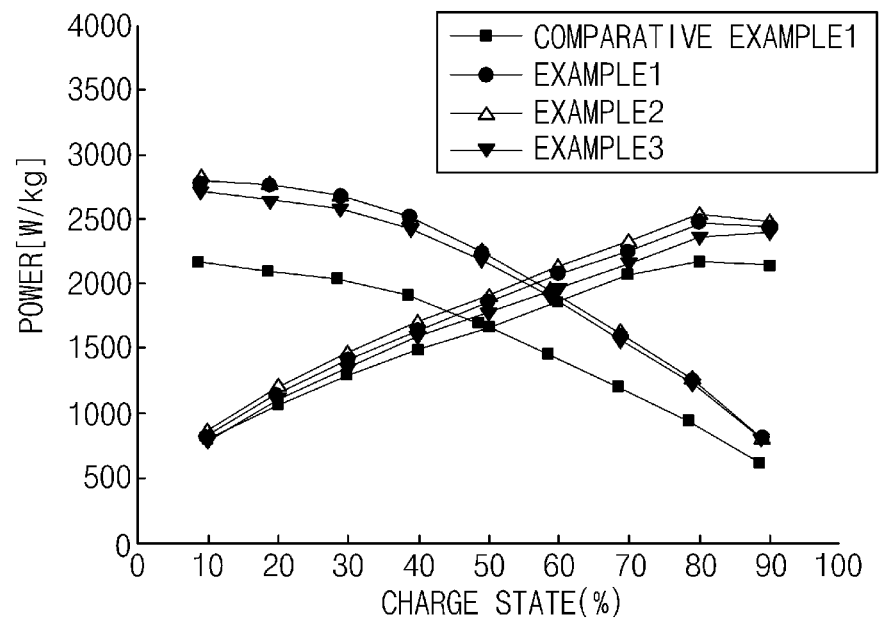
Figure 4A:
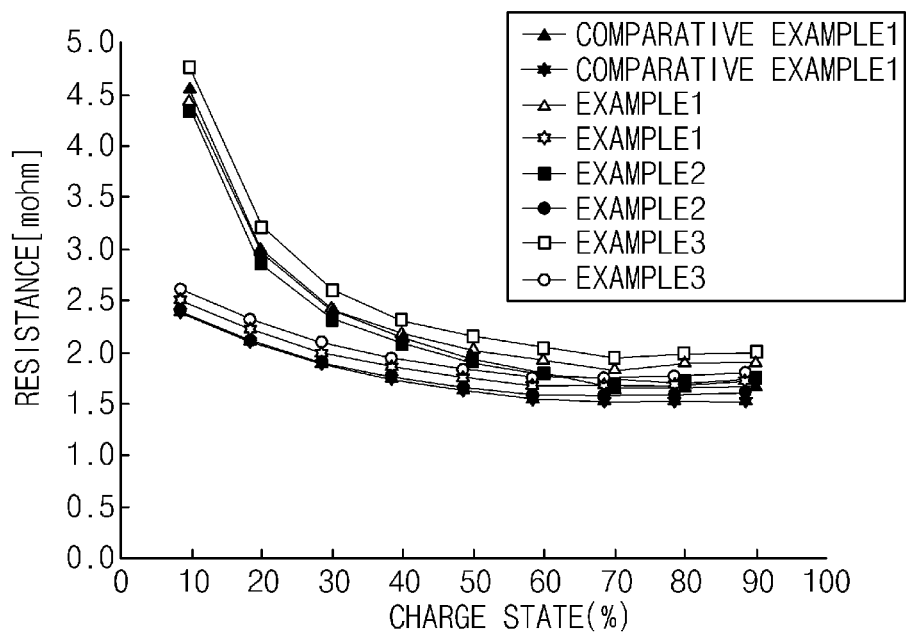
FIG. 4a and FIG. 4b show a result of measuring resistance characteristics of a lithium secondary battery according to the present disclosure in Experimental Example 4.
Figure 4B:
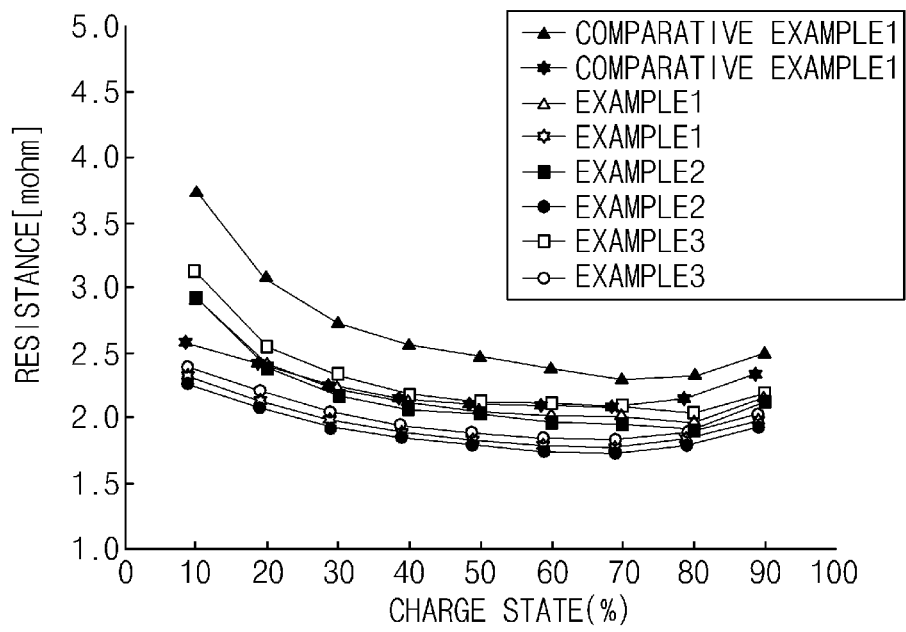

The result of measuring capacity retention rate after initial charging and discharging and 300 times of charging and discharging is shown in FIG. 3a and FIG. 3b. And, the result of measuring resistance characteristics after initial charging and discharging and 300 times of charging and discharging is shown in FIG. 4a and FIG. 4b.

As seen from FIG. 3a and FIG. 3b, the batteries of Examples 1-3 exhibited improved lifetime with capacity retention rate of about 80% after 300 cycles whereas the battery of Comparative Example 1 exhibited very low capacity retention rate of about 60% after 300 cycles. Also, as seen from FIG. 4a and FIG. 4b, whereas the battery of Comparative Example 1 showed worse resistance and output characteristics after 300 cycles as compared to the initial state in all SOC ranges, the battery of Example 1 showed improvement in resistance increase or output decrease after 300 cycles when compared with Comparative Example 1.

This result suggests that the second coating layer maintains binding between the current collector and the first coating layer during repeated charging and discharging and thus reduces the volume change of the anode active material, thereby preventing electrical isolation of the active material from the current collector. Accordingly, since the reversible intercalation and deintercalation of lithium ions can be maintained, it is expected that the cycle characteristics of the secondary battery can be improved.

The invention claimed is:

1. An anode for a secondary battery, comprising:
    an electrode current collector;
    a first coating layer formed on the electrode current collector and comprising an anode active material, a first aqueous binder and a conducting material; and
    a second coating layer formed on the first coating layer and consisting of a second nonaqueous binder,
    wherein the first aqueous binder is one or more aqueous binder selected from a group consisting of styrene-butyl acrylate rubber, carboxymethyl cellulose and hydroxypropyl cellulose,
    wherein the second nonaqueous binder is one or more nonaqueous binder selected from a group consisting of polyvinylidene fluoride, polyacrylonitrile, acrylonitrile-containing binder, polyvinyl chloride, polyvinylpyrrolidone, polytetrafluoroethylene, polyethylene and polypropylene, and
    wherein the first coating layer is coated only at a point of contact of neighboring anode active material particles and binds the anode active material particles.

2. The anode of claim 1, wherein the second coating layer is coated on the whole surface of the electrode on which the first coating layer has been formed or is coated selectively on the first coating layer.

3. The anode of claim 1, wherein the second coating layer is coated in an amount of not greater than 100 wt % based on the total weight of the electrode on which the first coating layer has been formed.

4. The anode of claim 3, wherein the second coating layer is coated in an amount of 1-50 wt % based on the total weight of the electrode on which the first coating layer has been formed.

5. The anode of claim 4, wherein the second coating layer is coated in an amount of 1-10 wt % based on the total weight of the electrode on which the first coating layer has been formed.

6. The anode of claim 5, wherein the second coating layer is coated in an amount of 1-5 wt % based on the total weight of the electrode on which the first coating layer has been formed.

7. A lithium secondary battery comprising the anode according to claim 1, a cathode, an electrolyte and a separator.

* * * * *